United States Patent
Komori et al.

(10) Patent No.: US 11,555,098 B2
(45) Date of Patent: Jan. 17, 2023

(54) MOLDING POWDER

(71) Applicant: DAIKIN INDUSTRIES, LTD., Osaka (JP)

(72) Inventors: Hirokazu Komori, Osaka (JP); Junpei Terada, Osaka (JP); Hiroyuki Sendan, Osaka (JP); Tadahiro Yabu, Osaka (JP); Yukihiro Fukagawa, Osaka (JP); Kenta Murayama, Osaka (JP); Tomohiro Shiromaru, Osaka (JP); Toshio Miyatani, Osaka (JP); Masahiro Kondou, Osaka (JP); Hiroyuki Hamada, Osaka (JP)

(73) Assignee: DAIKIN INDUSTRIES. LTD., Osaka (JP)

( * ) Notice: Subject to any disclaimer, the term of this patent is extended or adjusted under 35 U.S.C. 154(b) by 0 days.

(21) Appl. No.: 17/081,446

(22) Filed: Oct. 27, 2020

(65) Prior Publication Data

US 2021/0047497 A1 Feb. 18, 2021

Related U.S. Application Data

(63) Continuation of application No. PCT/JP2019/017887, filed on Apr. 26, 2019.

(30) Foreign Application Priority Data

Apr. 27, 2018 (JP) .............................. JP2018-087406

(51) Int. Cl.
*C08K 3/36* (2006.01)
*B33Y 70/00* (2020.01)
(Continued)

(52) U.S. Cl.
CPC .............. *C08K 3/36* (2013.01); *B29C 64/153* (2017.08); *B29C 64/314* (2017.08); *B33Y 70/00* (2014.12); *B29K 2027/18* (2013.01)

(58) Field of Classification Search
CPC ......... C08K 3/36; B33Y 70/00; B29C 64/314; B29C 64/153; B29K 2027/18
See application file for complete search history.

(56) References Cited

U.S. PATENT DOCUMENTS

2008/0033132 A1* 2/2008 Schlipf ..................... B29B 9/08
526/255
2011/0117485 A1 5/2011 Hermann et al.
(Continued)

FOREIGN PATENT DOCUMENTS

EP 1 950 229 A1 7/2008
EP 3 740 526 A1 11/2020
(Continued)

OTHER PUBLICATIONS

International Preliminary Report on Patentability dated Nov. 5, 2020 with a translation of the Written Opinion, issued by the International Bureau in application No. PCT/JP2019/017887.
(Continued)

*Primary Examiner* — Michael M. Robinson
(74) *Attorney, Agent, or Firm* — Sughrue Mion, PLLC

(57) ABSTRACT

A shaping material for a powder bed fusion method, including a powder of a fluororesin, wherein the fluororesin has a D50 of 30 μm or more and 200 μm or less, and the fluororesin has a D10 of 12 μm or more.

10 Claims, 1 Drawing Sheet

(51) Int. Cl.
*B29C 64/314* (2017.01)
*B29C 64/153* (2017.01)
*B29K 27/18* (2006.01)

(56) References Cited

U.S. PATENT DOCUMENTS

| | | |
|---|---|---|
| 2014/0163159 A1 | 6/2014 | Nakatani et al. |
| 2016/0304677 A1* | 10/2016 | Evans ............... B05D 3/002 |
| 2017/0174932 A1 | 6/2017 | Granlund et al. |
| 2018/0237627 A1 | 8/2018 | Liu et al. |
| 2018/0273707 A1 | 9/2018 | Price |
| 2019/0022928 A1* | 1/2019 | Bartow ............... C08L 23/12 |
| 2019/0030794 A1 | 1/2019 | Jiang et al. |
| 2019/0030795 A1 | 1/2019 | Jiang et al. |
| 2019/0127500 A1 | 5/2019 | Liu et al. |
| 2020/0024409 A1* | 1/2020 | Takeyama ............ C08J 5/042 |

FOREIGN PATENT DOCUMENTS

| | | |
|---|---|---|
| EP | 3 858 873 A1 | 4/2021 |
| JP | 2017-007221 A | 1/2017 |
| JP | 2021-510747 A | 4/2021 |
| WO | 2007/049591 A1 | 5/2007 |
| WO | 2007/133912 A2 | 11/2007 |
| WO | 2013/031858 A1 | 3/2013 |
| WO | 2017/040893 A1 | 3/2017 |
| WO | 2017/057333 A1 | 4/2017 |
| WO | 2017/127572 A1 | 7/2017 |
| WO | 2017/173258 A1 | 10/2017 |
| WO | 2018/066433 A1 | 4/2018 |

OTHER PUBLICATIONS

International Search Report for PCT/JP2019/017887 dated Jul. 23, 2019.
Extended European Search Report dated Dec. 16, 2021 in Application No. 19793553.9.

* cited by examiner

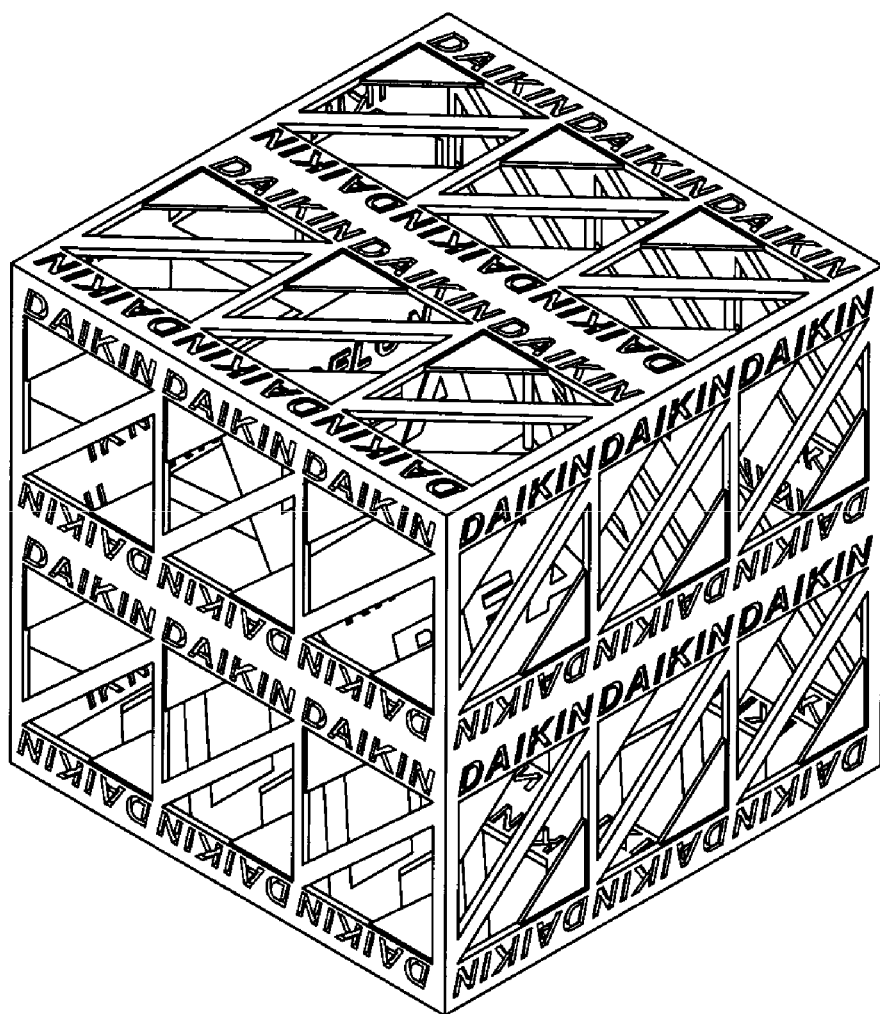

MOLDING POWDER

CROSS REFERENCE TO RELATED APPLICATIONS

This application is a Continuation of International Application No. PCT/JP2019/017887 filed Apr. 26, 2019, claiming priority based on Japanese Patent Application No. 2018-087406 filed Apr. 27, 2018, the contents of all of which are incorporated herein by reference in their entirety.

TECHNICAL FIELD

The present disclosure relates to a three-dimensionally shaping powder, and particularly relates to a shaping powder which is used in a powder bed fusion method.

BACKGROUND ART

In recent years, an interest in a three-dimensionally shaping apparatus, a so-called 3D printer, has increased as a technique of shaping a three-dimensional structure. As a system regarding three-dimensional shaping, for example, a vat photopolymerization method of performing shaping by irradiating a monomer of a photocurable resin in a vat with light, a material extrusion method of performing shaping by extruding a flowable material from a nozzle to stack the flowable material, a binder injection method of performing shaping by injecting a binder into a powder material to bind the powder material, an inkjet method of performing shaping by injecting a liquid resin and curing the injected liquid resin, and a powder bed fusion method of performing shaping by irradiating a powder material with an energy ray to fuse and cure or sinter the powder material selectively, and the like are known. Among others, an interest in the powder bed fusion method has increased in recent years.

Shaping by the above-described powder bed fusion method is generally performed in such a way that a powder material stored in a powder material storage container is pushed and taken out with a recoater and is carried onto a shaping stand to form a thin layer of the powder material, and this thin layer is irradiated with an energy ray to perform fusion. By repeating this operation, a three-dimensional structure is shaped. A production method and a production apparatus using such a powder bed fusion method are described in, for example, Patent Literatures 1 and 2.

CITATION LIST

Patent Literature

Patent Literature 1: Japanese Patent Laid-Open No. 2017-007221
Patent Literature 2: International Publication No. WO 2007/133912

SUMMARY OF INVENTION

Technical Problem

A shaping material may be one of various materials, such as general-purpose plastics and metals, in the powder bed fusion method, but shaping is difficult when a fluororesin is used as a shaping material. In Patent Literature 2, the fluororesin is shaped by the powder bed fusion method, but it is difficult to perform a good shaping simply by shaping the fluororesin.

Therefore, the present disclosure aims to provide a novel shaping material suitable for the powder bed fusion method.

Solution to Problem

The present inventors have found that controlling the volume accumulated particle diameter of the powder of the fluororesin improves the shaping by the powder bed fusion method.

The present disclosure includes the following embodiments.

[1] A shaping material for a powder bed fusion method, comprising a powder of a fluororesin,
wherein the fluororesin has a D50 of 30 µm or more and 200 µm or less, and
the fluororesin has a D10 of 12 µm or more.

[2] The shaping material according to 1, wherein the fluororesin has a D50 of 50 µm or more and 70 µm or less, and the fluororesin has a D10 of 17 µm or more.

[3] The shaping material according to 1 or 2, wherein the fluororesin has a D50 of 50 µm or more and 70 µm or less, the fluororesin has a D10 of 17 µm or more, and the fluororesin has a D90 of 130 µm or less.

[4] The shaping material according to any one of 1 to 3, wherein the powder of the fluororesin has a static bulk density of 0.850 g/ml or more and 1.500 g/ml or less.

[5] The shaping material according to any one of 1 to 4, wherein the powder of the fluororesin has a static bulk density of 0.950 g/ml or more and 1.100 g/ml or less.

[6] The shaping material according to any one of 1 to 5, wherein the fluororesin is a tetrafluoroethylene-perfluoroalkoxyethylene copolymer, a tetrafluoroethylene-hexafluoropropylene copolymer, or an ethylene-tetrafluoroethylene copolymer.

[7] The shaping material according to any one of 1 to 6, further comprising a material other than a fluororesin.

[8] The shaping material according to 7, wherein the other material is a silica, a carbon fiber, graphite, a carbon nanotube, a carbon nanohorn, fullerene, aluminum oxide, clay, montmorillonite, or talc.

[9] The shaping material according to 7, wherein the other material is a silica particle.

[10] A powder of a fluororesin, having a D50 of 30 µm or more and 200 µm or less and a D10 of 12 µm or more.

Advantageous Effects of Invention

By using the shaping material of the present disclosure, a three-dimensional structure of a fluororesin may be suitably formed by a powder bed fusion method.

BRIEF DESCRIPTION OF DRAWINGS

The FIGURE is a perspective view of a molded body made in Examples.

DESCRIPTION OF EMBODIMENTS

Hereinafter, a shaping material of the present disclosure will be described.

A fluororesin contained in the shaping material of the present disclosure is not limited as long as it is a fluororesin that may be used in a powder bed fusion method, that is a fusible fluororesin. The fluororesin may be preferably a thermoplastic fluororesin that is fusible with an energy ray including, for example, various types of lasers, such as, for example, $CO_2$ laser, fiber laser, and YAG laser, and is preferably $CO_2$ laser.

Examples of the fluororesin include, as a fluorine-containing olefin unit, one, or two or more of a tetrafluoroethylene (TFE) unit, a chlorotrifluoroethylene (CTFE) unit, a vinyl fluoride (VF) unit, a vinylidene fluoride (VDF) unit, a hexafluoropropylene (HFP) unit, a trifluoroethylene (TrFE) unit, a perfluoro(alkyl vinyl ether) (PAVE) unit, and fluorine-containing dioxoles. In one embodiment, examples of the PAVE unit include a perfluoromethyl vinyl ether unit, and a perfluoropropyl vinyl ether unit. In addition, examples of fluorine-free olefin units include a hydrocarbon-based monomer having reactivity with the above-described fluoroolefins. The hydrocarbon-based monomer is preferably at least one fluorine-free olefin unit selected from the group consisting of, for example, alkenes, alkyl vinyl ethers, vinyl esters, alkyl allyl ethers, and alkyl allyl esters.

In one embodiment, examples of the fluororesin include a tetrafluoroethylene-perfluoroalkoxyethylene copolymer (PFA), a tetrafluoroethylene-hexafluoropropylene copolymer (FEP), an ethylene-tetrafluoroethylene copolymer (ETFE), Neoflon EFEP (Trademark), a tetrafluoroethylene-hexafluoropropylene-perfluoro(alkyl vinyl ether) copolymer (PAVE), polychlorotrifluoroethylene (PCTFE), a chlorotrifluoroethylene-tetrafluoroethylene copolymer, an ethylene-chlorotrifluoroethylene copolymer, a tetrafluoroethylene-vinylidene fluoride copolymer, a vinylidene fluoride-hexafluoropropylene-tetrafluoroethylene copolymer, and a vinylidene fluoride-hexafluoropropylene-copolymer. These fluororesins may be used alone or as a mixture of two or more thereof.

In a preferred embodiment, the fluororesin can be, for example, a tetrafluoroethylene-perfluoroalkoxyethylene copolymer (PFA), a tetrafluoroethylene-hexafluoropropylene copolymer (FEP) or an ethylene-tetrafluoroethylene copolymer (ETFE). These fluororesins may be used alone or as a mixture of two or more thereof. These fluororesins are preferably used alone.

In one embodiment, the number average molecular weight of the fluororesin is not limited, and may be, for example, 100,000 or more and 10,000,000 or less, preferably 500,000 or more and 5,000,000 or less. In a preferred embodiment, the shaping material of the present disclosure may be used in a powder bed fusion method, and therefore the fluororesin may have a relatively low molecular weight of, for example, 3,000,000 or less, 2,000,000 or less, or 1,000,000 or less. By using a low-molecular-weight fluororesin, the mechanical strength of a shaped three-dimensional structure is improved.

The melting point of the fluororesin is not limited, and may be, for example, 100° C. or more and 350° C. or less, preferably 150° C. or more and 330° C. or less. By setting the melting point of the fluororesin to 100° C. or more, the heat resistance of a shaped three-dimensional structure is improved. In addition, the shaping temperature can be lowered by setting the melting point of the fluororesin to 350° C. or less.

In the present disclosure, the above-described fluororesin is contained in the shaping material as a powder.

The present inventors have conducted studies on a shaping material containing the above-described fluororesin and have noticed that to enhance shapability more, it is effective to make a thin layer which is formed with a recoater more uniform and to enhance the recoatability of a powder of the fluororesin on a shaping stand. The recoatability of the shaping material can be changed by changing a property of the powder of the fluororesin, such as, for example, fluidity. For example, by enhancing the fluidity of the powder of the fluororesin, the recoatability of the shaping material can be enhanced.

In the shaping material of the present disclosure, the powder of the fluororesin has a D50 of 30 μm or more and 200 μm or less and a D10 of 12 μm or more.

In one embodiment, the powder of the fluororesin may have a D50 of 30 μm or more and 200 μm or less, preferably 30 μm or more and 100 μm or less, more preferably 40 μm or more and 100 μm or less, still more preferably 40 μm or more and 80 μm or less, and particularly preferably 50 μm or more and 70 μm or less. By setting the D50 of the fluororesin to 30 μm or more, the fluidity of the shaping material is improved, and it makes easy to form a uniform thin layer. By setting the D50 of the fluororesin to be larger, the fluidity of the shaping material can be enhanced more. In addition, by setting the D50 of the fluororesin to 200 μm or less, it makes easy to obtain a smooth surface on a shaped three-dimensional structure. By setting the D50 of the fluororesin to be smaller, a smoother surface can be obtained on a three-dimensional structure.

In one embodiment, the powder of the fluororesin may have a D10 of 12 μm or more, preferably 13 μm or more, more preferably 15 μm or more, and still more preferably 17 μm or more. By setting the D10 of the powder of the fluororesin to 12 μm or more, the fluidity of the shaping material is improved, and it makes easy to form a uniform thin layer. By setting the D10 of the powder of the fluororesin to be larger, the fluidity of the shaping material can be enhanced more. In addition, the upper limit of the D10 of the powder of the fluororesin is more preferable as it is closer to D50 and is not limited. The closer D10 is to D50, the more the fluidity of the shaping material is improved, and it makes easy to form a uniform thin layer. For example, the D10 of the powder of the fluororesin may be 50 μm or less, 30 μm or less, or 20 μm or less.

In a preferred embodiment, the powder of the fluororesin has a D50 of 50 μm or more and 70 μm or less and a D10 of 17 μm or more.

In one embodiment, the powder of the fluororesin may have a D90 of preferably 50 μm or more and 500 μm or less, more preferably 60 μm or more and 200 μm or less, still more preferably 80 μm or more and 150 μm or less, and particularly preferably 90 μm or more and 130 μm or less. By setting the D90 of the powder of the fluororesin to 50 μm or more, the fluidity of the shaping material is improved, and it makes easy to form a uniform thin layer. By setting the D90 of the powder of the fluororesin to be larger, the fluidity of the shaping material can be enhanced more. In addition, setting the D90 of the powder of the fluororesin to 500 μm or less makes it easy to obtain a smooth surface on a shaped three-dimensional structure. By setting the D90 of the powder of the fluororesin to be smaller, a smoother surface can be obtained on a three-dimensional structure.

In a preferred embodiment, the powder of the fluororesin has a D50 of 50 μm or more and 70 μm or less, a D10 of 17 μm or more, and a D90 of 130 μm or less.

The "D10", "D50", and "D90" herein refer to so-called volume accumulated particle diameters, and refer to particle diameters where cumulative values are 10%, 50%, and 90% respectively when they are arranged from smallest in a cumulative curve assuming the whole volume to be 100% in a particle size distribution determined on a volume basis. In the present disclosure, the particle diameters are measured by a laser diffraction method.

In one embodiment, the static bulk density of the powder of the fluororesin may be preferably 0.850 g/ml or more and 1.500 g/ml or less, more preferably 0.900 g/ml or more and 1.300 g/ml or less, and still more preferably 0.950 g/ml or more and 1.100 g/ml or less. By setting the static bulk density of the powder of the fluororesin to 0.850 g/ml or more, a volume change that occurs when the fluororesin is fused to be shaped can be made small. By setting the static bulk density of the fluororesin to be larger, the volume change at the time of shaping can be made smaller. In addition, by setting the static bulk density of the powder of the fluororesin to 1.500 g/ml or less, the fluidity of the shaping material is improved, and it makes easy to form a uniform thin layer. By setting the static bulk density of the fluororesin to be smaller, the fluidity of the shaping material can be enhanced more. It is to be noted that in the present disclosure, the static bulk density is measured by the method described in JIS K6891.

In one embodiment, the Hausner ratio of the powder of the fluororesin may be preferably 1.10 or more and 1.30 or less, more preferably 1.20 or more and 1.25 or less. By setting the Hausner ratio of the powder of the fluororesin to be within the range, the fluidity of the shaping material is improved, and it makes easy to form a uniform thin layer. The "Hausner ratio" herein refers to a ratio represented by tapped density/static bulk density. It is to be noted that the Hausner ratio in the present disclosure is measured with a powder tester (manufactured by HOSOKAWA MICRON CORPORATION).

In one embodiment, the sphericity of the powder of the fluororesin may be preferably 0.60 or more, more preferably 0.60 or more and 0.98 or less, still more preferably 0.70 or more and 0.95 or less, and further still more preferably 0.80 or more and 0.95 or less. By setting the sphericity of the powder of the fluororesin to be within the range, the fluidity of the shaping material is improved, it makes easy to form a uniform thin layer.

The "sphericity" herein refers to deviation of the powder from a sphere, and refers to an average value of a ratio of the maximum diameter of each particle to the short diameter that is orthogonal to the maximum diameter (maximum diameter/shorter diameter) for arbitrary 50 particles in a photographic projection obtained by taking a photograph with a transmission electron microscope. The powder gets closer to a sphere as the sphericity gets closer to 1.

The powder of the fluororesin which is used in the present disclosure is not limited, and may be produced by, for example, a method including the followings.

Polymerizing a fluorine-containing ethylenic monomer by suspension polymerization, thereby obtaining a powder of a fluorine-containing polymer as polymerized, optionally increasing the density of the powder as polymerized with a roll under a condition capable of obtaining a specific gravity of 90% or more of true specific gravity, thereby obtaining a pulverized powder, placing the powder as polymerized or the pulverized powder into a friction type mill, processing the powder as polymerized or the pulverized powder into a desired shape, and collecting a fluorine-containing polymer powder from the friction type mill.

The fluorine-containing polymer powder which is obtained by the above-described production method has been processed into a desired shape with a friction type mill and therefore has a spherical shape and a high static bulk density. The production method is more excellent in productivity than a conventional method, and therefore a powder particle having a high static bulk density may be obtained in a highly efficient manner.

Friction Type Mill

The friction type mill is an apparatus such that a plurality of vanes is arranged at an outer circumferential portion of a rotary shaft inside a drum, and a powder is fluidized in the drum by the rotating of these vanes to cause centrifugal diffusion and vortex flow actions. The powder is received to mechanical stress by being pressed to an inner wall of the apparatus. A stirring member having a function of feeding and returning the powder to and from a rotational shaft direction may be operated. It is preferable to perform processing at a temperature of the fluorine-containing polymer powder in a range of 50 to 200° C.

Further, the friction type mill is preferably a friction type mill whose specifications are such that: the mill includes a rotor provided with a plurality of blades at the outer circumference thereof, and a casing provided with a cylindrical inner circumferential surface adjacent to tip portions in the radial directions of the blades; the blades adjacent to each other along the shaft center direction of the rotor are each extended toward a different direction from the shaft center; and at least one pair of blades adjacent to each other along the shaft center are each inclined in a reverse direction to the shaft center. Such an apparatus, for example, an apparatus described in Japanese Patent Laid-Open No. 2010-180099 can be used.

In an apparatus having such specifications, large compressive force and shear force are applied to the powder between the tip portions in the radial directions of a plurality of blades and the inner circumferential surface of the casing, so that a powder having a high static bulk density can effectively be produced.

Examples of such an apparatus include NOBILTA manufactured by HOSOKAWA MICRON CORPORATION.

The shaping material of the present disclosure may contain an additional material other than the powder of the fluororesin.

Examples of the additional material include shaping auxiliaries, such as, for example, silica ($SiO_2$) (for example, a silica particle or a silica glass fiber), a carbon fiber, graphite, a carbon nanotube, a carbon nanohorn, fullerene, aluminum oxide, clay, montmorillonite, and talc. By adding a shaping auxiliary, especially silica, to the shaping material of the present disclosure, the fluidity and shapability of the shaping material are improved.

In a preferred embodiment, the shaping material of the present disclosure may be a mixture of a fluororesin material and silica.

The content of the silica may be preferably 0.1% by weight or more and 1.0% by weight or less, more preferably 0.1% by weight or more and 0.5% by weight or less, and still more preferably 0.1% by weight or more and 0.3% by weight or less based on the whole amount of the shaping material. By setting the content of silica to 0.1% by weight or more, the fluidity and shapability of the shaping material are improved. By setting the content of silica to be larger, the fluidity and shapability of the shaping material, and the mechanical strength of the three-dimensional structure are improved more. In addition, by setting the content of silica to 1.0% by weight or less, the content of the fluororesin can sufficiently be secured, so that the characteristics of the fluororesin can sufficiently be exhibited in a three-dimensional structure.

The silica preferably has a particle diameter equivalent to the particle diameter of the fluororesin.

Examples of other additional materials include a laser-absorbing colorant. The laser-absorbing colorant is not limited as long as it is a material that can absorb laser light having a wavelength of around 1 µm, and may be carbon, a metal, a pigment, a dye, and the like. Preferably, carbon is used as a main component. The laser-absorbing colorant preferably has an average particle diameter of about 10 µm and has a particle diameter range of 2 µm or more and 40 µm or less. The content of the laser-absorbing colorant in the shaping material is preferably in a range of, for example, 0.05% by weight or more and 0.20% by weight or less.

In one embodiment, the silica particle may have a D50 of 30 µm or more and 200 µm or less, preferably 30 µm or more and 100 µm or less, more preferably 40 µm or more and 100 µm or less, still more preferably 40 µm or more and 80 µm or less, and particularly preferably 50 µm or more and 70 µm or less.

In another preferred embodiment, the shaping material of the present disclosure consists of a powder of a fluororesin.

Next, a method of shaping the shaping material of the present invention, the method using a powder bed fusion method, will be described.

A shaping apparatus using a powder bed fusion method is generally provided with a powder storage container that stores a shaping material on both sides of a shaping stand where shaping is performed. The shaping apparatus is further provided with: a recoater that supplies the shaping material in the powder storage container to the shaping stand to form a thin layer; and a laser unit by which the thin layer is irradiated with laser.

Firstly, the shaping material in a necessary amount is stored in the powder storage container. Subsequently, the shaping stand is lowered by the height corresponding to the thickness of the thin layer. On the other hand, the bottom of the powder storage container is lifted to put an appropriate amount of the shaping material up above the powder storage container. This shaping material is carried onto the shaping stand by the recoater, and the recoater is moved in such a way as to scrape on the surface, thereby forming a thin layer on the shaping stand. Subsequently, the powder is cured by scanning laser light based on a slice data of a three-dimensional structure to be shaped and fusing the thin layer. By repeating this operation, layers corresponding to the slice data are formed sequentially, and thus the three-dimensional structure is shaped.

Preferably, the temperature of the powder in the powder storage container which is a supply area and the temperature of the powder on the shaping stand which is a shaping area are controlled appropriately in shaping according to the shaping material to be used. By controlling such temperatures, a more uniform thin layer can be formed, and moreover, performing more precise shaping is enabled.

EXAMPLES

As shown in Table 1 below, as fluororesins, the powders of PFA, FEP, ETFE, and EFEP were prepared. Each powder was made into samples (the minimum thickness of the walls was 0.8 mm), as shown in the Figure, each being a hollow cube having a length of one side of 60 mm, the hollow cube including inside thereof a hollow cube having a length of one side of 30 mm, using a powder bed fusion type 3D printer. Table 1 also shows the temperatures of the supply area and the shaping area at the time of shaping, and the evaluation results on the recoatability and the shapability.

The recoatability was evaluated as ○ when the powder could be spread over the surface without any aggregation of the powder or roughness on the surface of the shaping area occurring at the time of recoating, Δ when aggregation or surface roughness less likely occurred, and × when aggregation or surface roughness occurred.

The shapability was evaluated as ○ when a shaped product with a small warp and a good surface condition was obtained, Δ when a shaped product with a small warp was obtained, but a slight roughness on the surface was observed, × when the warp was large and a good shaped product could not be obtained.

TABLE 1

| Item | | Unit | Example 1 PFA | Example 2 PFA | Example 3 PFA | Comparative Example 1 PFA | Comparative Example 2 PFA |
|---|---|---|---|---|---|---|---|
| Static bulk density | | g/ml | 1.042 | 0.957 | 0.988 | 0.843 | 0.8 |
| Particle size distribution | D10 | µm | 19.10 | 17.53 | 18.11 | 15.62 | 12 |
| | D50 | µm | 68.69 | 53.18 | 55.69 | 29.02 | 22 |
| | D90 | µm | 139.7 | 96.30 | 100.35 | 50.31 | 50 |
| Melting point | | °C. | 300 | 300 | 257 | 300 | 300 |
| Shaping temperature | Supply area | °C. | 260 | 260 | 200 | 260 | 230 |
| | Shaping area | °C. | 280 | 280 | 230 | 280 | 260 |
| Recoatability | | — | ○ | ○ | ○ | × | × |
| Shapability | | — | Δ | ○ | ○ | × | × |

| Item | | Unit | Comparative Example 3 FEP | Comparative Example 4 FEP | Comparative Example 5 ETFE | Comparative Example 6 EFEP |
|---|---|---|---|---|---|---|
| Static bulk density | | g/ml | 0.801 | 0.9 | 0.9 | 0.6 |
| Particle size distribution | D10 | µm | 13.53 | 8 | 25 | 11 |
| | D50 | µm | 29.45 | 15 | 220 | 36 |
| | D90 | µm | 60.78 | 47 | 420 | 100 |
| Melting point | | °C. | 257 | 257 | 220 | 164 |
| Shaping temperature | Supply area | °C. | 200 | 200 | 180 | 120 |
| | Shaping area | °C. | 230 | 200 | 200 | 140 |
| Recoatability | | — | × | × | Δ | × |
| Shapability | | — | × | × | × | × |

As a result of the above tests, in Comparative Examples 1 to 4 and 6, the powder was aggregated at the time of recoating, and the shaped product was warped. In addition, in Comparative Example 5, aggregation hardly occurred at the time of recoating, but the shaped product was warped, and roughness on the surface of the shaped product was observed. In Example 1, the recoatability was good and the warp of the shaped product was also small, but a slight roughness was observed on the surface of the shaped product. In Examples 2 and 3, the recoatability was good, the warp of the shaped product was small, and a shaped product having a good surface condition could be obtained.

INDUSTRIAL APPLICABILITY

The shaping material of the present disclosure can suitably be utilized for shaping various products, especially for shaping by a powder bed fusion method.

The invention claimed is:

1. A shaping material comprising a powder consisting of a fluororesin,
wherein the powder has a D50 of 30 μm or more and 200 μm or less, and
the powder has a D10 of 17 μm or more.

2. The shaping material according to claim 1, wherein the powder has a D50 of 50 μm or more and 70 μm or less.

3. The shaping material according to claim 1, wherein the powder has a D50 of 50 μm or more and 70 μm or less, the powder has a D90 of 130 μm or less.

4. The shaping material according to claim 1, wherein the powder of the fluororesin has a static bulk density of 0.850 g/ml or more and 1.500 g/ml or less.

5. The shaping material according to claim 1, wherein the powder of the fluororesin has a static bulk density of 0.950 g/ml or more and 1.100 g/ml or less.

6. The shaping material according to claim 1, wherein the fluororesin is a tetrafluoroethylene-perfluoroalkoxyethylene copolymer, a tetrafluoroethylene-hexafluoropropylene copolymer, or an ethylene-tetrafluoroethylene copolymer.

7. The shaping material according to claim 1, further comprising a silica, a carbon fiber, graphite, a carbon nanotube, a carbon nanohorn, fullerene, aluminum oxide, clay, montmorillonite, or talc.

8. The shaping material according to claim 1, further comprising a silica particle.

9. The shaping material according to claim 1, wherein the fluororesin has a number average molecular weight of 3,000,000 or less.

10. The shaping material according to claim 1, further comprising a silica particle having a D50 of 30 μm or more and 200 μm or less.

* * * * *